United States Patent Office 3,851,065
Patented Nov. 26, 1974

3,851,065
**METHOD OF AND COMPOSITION FOR STABILIZING *TRANS*-DIETHYLSTILBESTROL IN ANIMAL FEED RATIONS**
Nelson H. Ludwig, Greenfield, Ind., assignor to Eli Lilly and Company, Indianapolis, Ind.
No Drawing. Filed Feb. 13, 1970, Ser. No. 11,301
Int. Cl. A23k 1/22
U.S. Cl. 424—346     5 Claims

ABSTRACT OF THE DISCLOSURE

Method and composition are provided for stabilizing *trans*-diethylstilbestrol in animal feed rations comprising incorporating *trans*-diethylstilbestrol therein as a component in intimate admixtures of *trans*-diethylstilbestrol and urea in which the particles of *trans*-diethylstilbestrol and urea are in adherent contact with one another.

BACKGROUND OF THE INVENTION

This invention relates to a method of, and compositions for, the stabilization of *trans*-diethylstilbestrol in animal feed rations.

Diethylstilbestrol, $\alpha,\alpha'$-diethyl-4,4'-stilbenediol, is an important synthetic estrogen. First used successfully in human medicine as a substitute for naturally occurring female hormones, it has been employed more recently to promote the fattening of ruminant animals, particularly cattle. U.S. Pat. No. 2,751,303 describes this latter use in which diethylstilbestrol is administered to the animal as a feed additive.

Diethylstilbestrol can exist in two distinct geometric configurations. The *trans*-isomer is known to be the biologically active form, while the *cis*-isomer is essentially inactive, having been reported by Dodds to have only about one-twentieth of the estrogenic activity of the *trans*-isomer [Dodds, C., *Biochemical Contributions to Endocrinology, Experiments in Hormonal Research*, p. 34, Stanford University Press, Palo Alto, Calif. (1957)]. It has been found that the *cis*-isomer is also essentially ineffective in promoting weight gains in lambs.

It has been assumed generally that diethylstilbestrol is always present as *trans*-diethylstilbestrol and that the *cis*-isomer is difficult to obtain. It has been reported that the *cis*-form tends to revert to the *trans*-isomer [The Merck Index, 8th ed., Merck & Co., Rahway, N.J. (1968) (Derkosch, Friedrick, *Monatsh.*, 84, 1146, 1953)]. This assumption has been fostered by the classical concept of *cis-trans*-isomerism which regards the *trans*-form as having the lower energy content. In accordance with this concept, the *trans*-form would be more likely to retain its geometric configuration because an energy input would be required to effect the *trans*- to *cis*-conversion [Eliel, E. L., *Stereochemistry of Carbon Compounds*, McGraw-Hill, New York, p. 337 et seq. (1962)]. Moreover it has been known for some time that *trans*-diethylstilbestrol, in a substantially geometrically pure form, is obtained readily by precipitation from an acidic medium. While *cis*-diethylstilbestrol can be present in trace amounts in the precipitate, it has not been possible by known procedures to isolate the pure *cis*-diethylstilbestrol.

It has now been discovered that when *trans*-diethylstilbestrol is incorporated into animal feed rations by prior art processes, a substantial conversion of *trans*-diethylstilbestrol to the *cis*-isomer takes place in the feed mixture over a period of time which may vary from a few days to several months. The amount of conversion and the rate at which it takes place depend on the ingredients comprising the feed ration, the method of preparation, and the conditions of storage and use of the feed. The extent of the conversion varies upward from about 5 percent, is generally between 20 and 30 percent, and on rare occasions may exceed 35 percent. The reasons for the conversion are not fully understood. Effective methods for stabilizing the *trans*-diethylstilbestrol isomer in animal feed rations would, therefore, constitute a significant advance in the art.

SUMMARY

This invention provides a method for essentially preventing the conversion of *trans*-diethylstilbestrol to the *cis*-isomer in animal feed rations. The process comprises incorporating *trans*-diethylstilbestrol in the feed as a component of a composition comprising a multiplicity of particles of *trans*-diethylstilbestrol and urea in intimate admixture and in adherent contact with one another.

DESCRIPTION OF SPECIFIC EMBODIMENTS

It has now been discovered that the conversion of *trans*-diethylstilbestrol to the *cis-isomer* in animal feed compositions can be essentially prevented by incorporating the *trans*-diethylstilbestrol into the animal feed ration as a component in a composition comprising a multiplicity of particles of *trans*-diethylstilbestrol and urea in intimate admixture and in adherent contact with one another.

While the exact mechanism that promotes the *trans*- to *cis*-isomerization of diethylstilbestrol in animal feed rations is not completely understood, it is now known that the isomerization appears to be promoted when the diethylstilbestrol is in solution.

Prior art methods employed processes which comprise putting the diethylstilbestrol into solution in a suitable high boiling, low vapor pressure solvent and mixing the resulting diethylstilbestrol solution with an appropriate feedstuff carrier. The solvent thus becomes a permanent component of the animal feed ration, and consequently the diethylstilbestrol effectively remains in solution within the droplets of the solvent. Illustrative of solvents used in prior art processes are vegetable oils, such as soybean oil, and edible glycols, such as propylene glycol and polyethylene glycol 200.

Many of the common ingredients found in most animal feed rations, such as ground corn, soybean meal, ground barley, alfalfa granules, and the like, contain diethylstilbestrol dissolving substances such as vegetable oils, xanthophylls, alcohols, and the like.

The novel method of this invention not only avoids the introduction of residual solvents for diethylstilbestrol into animal feed rations but also lessens the exposure of the diethylstilbestrol to naturally occurring solvents which are present in feedstuff ingredients.

The useful method of this invention provides the advantage of enhancing the stability of the *trans*-diethylstilbestrol isomer in animal feed rations, thus effectively assuring that the animal which consumes the diethylstilbestrol-containing feed will be ingesting essentially *trans*-diethylstilbestrol, the physiologically active isomer. The benefit to the animal husbandryman stems from the fact that the amount of the active *trans*-isomer consumed is increased from a quantity which may be as low as 65 percent of the total diethylstilbestrol to 95 percent or more of the diethylstilbestrol content, thereby maximizing the weight gains attributable to the diethylstilbestrol fed to the animals.

The novel method of this invention also minimizes the hazard to workmen which generally accompanies the mixing of diethylstilbestrol into animal feed rations. *Trans*-diethylstilbestrol is a highly potent estrogen that is absorbed through the skin and mucous membranes and produces undesirable secondary female sex characteristics in males. It is, therefore, imperative that extraordinary care be taken to protect workmen from even minute quantities of the estrogen. In the useful method of this invention the *trans*-diethylstilbestrol employed in the mixing operation is present in the form of relatively large, dry, non-oily particles which are less likely to cling to the clothing and skin of the workman, thus effectively reducing the hazards associated with the handling of diethylstilbestrol.

In carrying out the method of this invention, *trans*-diethylstilbestrol is first combined with urea to provide a composition in which a multiplicity of particles of *trans*-diethylstilbestrol and urea are in intimate admixture and in adherent contact with one another.

The term "adherent contact" as used herein means a physical bonding such as is effected by a change in the physical form of one or both of the constituents while in the presence of the other. Thus, for example, such physical bonding results when the solvent is evaporated from a dispersion of urea and *trans*-diethylstilbestrol in a volatile solvent in which one or the other of the dispersants is soluble. Similar bonding is effected when a dispersion of solid *trans*-diethylstilbestrol in molten urea is cooled below the solidification temperature of the urea. Other means whereby the desired physical bonding can be effected will be readily apparent to those skilled in the art.

*Trans*-diethylstilbestrol-urea compositions suitable for use in the present invention can contain between about 0.22 percent and about 95 percent by weight of *trans*-diethylstilbestrol and between about 5 percent and about 99.78 percent by weight of urea.

In a preferred embodiment of this invention the preparation of a suitable composition in which the *trans*-diethylstilbestrol and urea are substantially uniformly interspersed in granules of a size suitable for incorporation into an animal feed ration is preferably accomplished by dispersing *trans*-diethylstilbestrol in a non-halogenated liquid vehicle, uniformly admixing an appropriate quantity of urea with the dispersion, evaporating the liquid vehicle therefrom, and processing the resulting solid composition to the desired granule size.

The term "size suitable for incorporation into an animal feed ration" as used herein means a particle size range such that at least about 90 percent of the particles pass through a 20 mesh screen and no more than about 10 percent of the particles pass through a 60 mesh screen. The foregoing mesh sizes refer to U.S. sieve numbers. This mesh size range corresponds to a particle size from about 150 to about 850 microns and encompasses the particle sizes usually found in non-pelleted feeds. Those skilled in the art will recognize that the particle size herein defined can be altered to different specifications if the circumstances of use so indicate without impairing the usefulness of this invention.

Suitable liquid vehicles in which *trans*-diethylstilbestrol can be dispersed include those in which both *trans*-diethylstilbestrol and urea are soluble, as well as those in which only one of the components is soluble. However, some conversion to the *cis*-isomer can occur in solution; the isomerization appearing to proceed most rapidly in halogenated hydrocarbons. Such solvents, therefore, should be avoided. Moreover, the rate of conversion varies with the chemical character of the solvent and the temperature to which the solution is subjected. Since the liquid vehicle is evaporated in this process, and because the rate of isomerization is accelerated as the temperature of the solution is raised, it is preferred that the liquid vehicle have a boiling temperature no higher than that of water. It has been found that the *trans-cis*-isomerization is slowest in $C_1$–$C_3$ monohydric alcohols and acetone, so these are especially preferred as liquid vehicles as they also boil at relatively low temperatures.

Other suitable liquid vehicles include aqueous dispersions of methylcellulose, sodium carboxymethylcellulose, hydroxypropylcellulose, polyvinylpyrrolidone, and the like; water, diethyl ether, *n*-propyl ether, isopropyl ether, benzene, *n*-pentane, 2-methylbutane, *n*-hexane, 2-methylpentane, 3-methylpentane (isohexane), 2,2-dimethylbutane, 2,3-dimethylbutane, *n*-heptane, 2,2-dimethylpentane, 2,2,3-trimethylbutane, and the like.

In carrying out the novel process of this invention it is preferred to dissolve *trans*-diethylstilbestrol in methanol, 95 percent ethanol, n-propanol, isopropanol, or acetone at room temperature in a concentration of from about 5 to about 50 gms. per 100 ml. of solvent. It is especially preferred to dissolve between about 30 and about 40 gms. of *trans*-diethylstilbestrol in 100 ml. of 95 percent ethanol. Alternatively, the *trans*-diethylstilbestrol can be slurried in a liquid vehicle such as a 0.1 to 5.0 percent aqueous dispersion of methylcellulose, water, n-pentane, and the like in a concentration of from about 5 to about 40 gms. per 100 ml. of liquid vehicle at room temperature. When the *trans*-diethylstilbestrol is in suspension rather than in solution the particle size of the estrogen should be 44 microns or below (−325 mesh).

The *trans*-diethylstilbestrol solution, or suspension, prepared as illustrated above, is intimately admixed with urea in an amount such that the ratio of *trans*-diethylstilbestrol to urea is from 1:450 to 19:1 parts by weight. The liquid vehicle is evaporated, at a temperature preferably below 50° C., leaving a multiplicity of particles of *trans*-diethylstilbestrol and urea substantially uniformly interspersed and in adherent contact with one another in a solid composition. The solid composition is processed to a particle size range suitable for incorporation into an animal feed ration.

A preferred process for carrying out the novel method of this invention comprises the utilization of a composition prepared by spraying a solution of *trans*-diethylstilbestrol in 95 percent ethanol onto feed-grade urea prills with mixing, preferably in a rolling bed, whereby some of the urea is dissolved in the 95 percent ethanol and subsequently co-deposited with the *trans*-diethylstilbestrol on the undissolved urea as the solvent is evaporated therefrom. Urea prills of a size suitable for incorporation into an animal feed ration are employed. The spraying of the *trans*-diethylstilbestrol solution is regulated to a rate such that the mixing action of the bed of urea prills is not impeded and is continued until the product contains from about 1 to about 100 gms. of *trans*-diethylstilbestrol per lb. of the combined urea and *trans*-diethylstilbestrol. A similar product can be obtained by the alternative process of slurrying *trans*-diethylstilbestrol in a 0.5 percent aqueous dispersion of methylcellulose and spraying the suspension onto the urea prills as described above for the aqueous ethanol solution.

In another exemplification of the preferred embodiment of this invention, *trans*-diethylstilbestrol can be dispersed in a concentration of from 5 to 50 gms./100 ml. in a liquid vehicle in which urea is soluble. Urea is added to the liquid dispersion of *trans*-diethylstilbestrol in an amount such that the ratio of *trans*-diethylstilbestrol to urea is from 1:450 to 19:1, and the amount of urea is at least 5 percent of the amount of *trans*-diethylstilbestrol in the liquid vehicle. The components are thoroughly and homogeneously mixed and the liquid vehicle is evaporated at 50° C. or below under vacuum. The resulting solid composition is pulverized to a particle size range suitable for incorporation into an animal feed ration.

In another embodiment of this invention a suitable *trans*-diethylstilbestrol-urea composition can be prepared by dispersing from about 0.22 to about 22 percent by weight of *trans*-diethylstilbestrol having a particle size of 44 microns or less in molten urea at from about 135°

C. to about 170° C., rapidly cooling the melt to effect solidification while maintaining a homogeneous dispersion, and sizing the resulting solid composition to granules suitable for incorporation into an animal feed ration. The temperature range specified above is a preferred range since it has been found that some *cis*-isomer is formed when *trans*-diethylstilbestrol is melted at about 171° C. The particle size range specified for the *trans*-diethylstilbestrol is preferred for the preparation of granules within the 150–850 micron size range desired for incorporation into feed rations. Those skilled in the art will recognize that for the preparation of smaller or larger granules, the particle size of the *trans*-diethylstilbestrol can be altered in the appropriate direction. It is desirable to bring the temperature down to the solidification temperature of about 133° C. or below as rapidly as possible to minimize the production of biuret which occurs slowly when urea is heated above the melting point. Biuret, while not a specifically desired constituent of animal feedstuffs, is always present in small amounts in urea, and no undesirable effects result from the presence thereof.

The sizing of the solid composition can be accomplished by methods known in the art, such as, for example, by grinding in any of a variety of hammer mills followed by screening to obtain the desired particle size range.

In still another embodiment of this invention, *trans*-diethylstilbestrol is stabilized in animal feed rations by incorporating the *trans*-diethylstilbestrol into the animal feed ration as a component of a composition comprising a multiplicity of particles of *trans*-diethylstilbestrol each of which is independently enveloped in a substantially continuous adherent coating of urea. A composition in which urea envelopes each independent particle of *trans*-diethylstilbestrol in a substantially continuous adherent coating is preferably prepared by placing *trans*-diethylstilbestrol particles of the order of 100–1,000 microns in diameter in an apparatus such as a coating pan, ribbon mixer, fluidized bed chamber, or any device that can be utilized to impart a rolling, tumbling action to the bed of particles. Urea is dissolved in an amount of from about 10 percent to about 50 percent weight/volume, in a suitable solvent, preferably water, such solvent being one in which diethylstilbestrol is essentially insoluble. The mixing of the bed is started and, after a uniform rolling action is effected, the urea solution is added to the turning bed intermittently in small increments, or continuously as a fine spray, at a rate such that the smooth, continuous movement of the particles is not impeded. The solvent is evaporated by diffusing warm air at from about 40° to about 135° C. over and through the moving bed. The addition of the urea solution to the moving particles is continued until substantially all of the *trans*-diethylstilbestrol particles are enveloped in a substantially continuous adherent coating of urea. The mixing action and the diffusion of warm air over and through the moving bed is continued until all of the solvent has been evaporated.

Alternatively, a substantially continuous coating of urea can be achieved by adding molten urea at from about 135° to about 170° C. to the moving particles of *trans*-diethylstilbestrol. The temperature of the urea should be maintained below about 170° C. to avoid melting of the *trans*-diethylstilbestrol and to minimize the formation of biuret. When molten urea is employed to effect the coating of the *trans*-diethylstilbestrol particles, it is preferred to heat the *trans*-diethylstilbestrol particles to between about 60° and about 125° C. to avoid a too-rapid solidification of the urea which results in the deposit of an irregular and discontinuous coating. Those skilled in the art will recognize that the rate of addition of the molten urea to the moving particles will vary with the temperature of the melt, the temperature of the rolling bed, and the frequency of turnover of the particles in the bed.

Generally, the quantity of urea required to achieve a substantially continuous coating of the *trans*-diethylstilbestorol particles will be in inverse proportion to the size of the particles, the smaller particles requiring the greater amount of urea. Particles of the order of 1,000 microns can be effectively coated with as little as 5 percent by weight of urea based upon the weight of the *trans*-diethylstilbestrol. On the other hand, particles of the order of 100 microns in diameter can require 50 percent, or more, by weight of urea to obtain a continuous coating. It will be recognized by those skilled in the art that urea in excess of the amount needed to effect the substantially continuous coat will not further aid in the stabilization of the *trans*-isomer and although not injurious, will necessarily add to the cost of the *trans*-diethylstilbestrol-urea composition. It will also be recognized by those skilled in the art that the significant feature of this embodiment of the present invention lies in the continuous nature of the coating and not in the ratio of urea to *trans*-diethylstilbestrol. The amount of *trans*-diethylstilbestrol in the composition can be between about 1 percent and about 95 percent without impairing the effectiveness of the composition. When *trans*-diethylstilbestrol particles of the order of 150–850 microns in diameter, a particle size range especially suited to incorporation into animal feed rations, are enveloped in a substantially continuous coating of urea the *trans*-diethylstilbestrol-urea ratio will generally be from 1:3 to 3:1.

The *trans*-diethylstilbtstrol-urea compositions provided by the present invention afford a stabilized form of *trans*-diethylstilbestrol which, when incorporated into animal feed rations by methods known in the art, effectively inhibits conversion of *trans*-diethylstilbestrol to the inactive *cis*-isomer. "Animal feed rations" as employed herein refers to compositions generally employed as solid feed premixes, solid feed concentrates, solid feed supplements, finishing feed rations, complete feed rations, and the like.

The compositions prepared by the novel process of this invention are preferably mixed with alfalfa granules, soybean meal, or other suitable diluents, such as those referred to in U.S. Pat. No. 3,356,504, to provide an acceptable feed premix. However, in the case of compositions wherein the concentration of *trans*-diethylstilbestrol is from about 1 to about 10 gms./lb. of the *trans*-diethylstilbestrol-urea composition, it is not necessary to add a diluent thereto to provide an acceptable feed premix. *Trans*-diethylstilbestrol-containing solid premixes are generally blended with feed concentrates, feed supplements, finishing feeds, or complete feed rations so as to obtain a concentration of about 0.5 mg. to about 20 mg. of *trans*- diethylstilbestrol per pound of the nutritionally enriched feed ration provided to the animal.

The determination of the *cis*- and *trans*-diethylstilbestrol content of the various compositions described herein can be accomplished by gas-liquid chromatography of the bis-trimethylsilyl ether derivatives thereof. The sample containing the isomer mixture is reacted with an excess of N,O-bis-(trimethylsilyl) acetamide for about 20 minutes and the bis-trimethylsilyl ether derivative formed is taken up in chloroform. The chloroform solution is then injected into a Hewlett Packard F and M Model 402 gas chromatograph utilizing a 4-foot column packed with 3 percent JXR on 80–100 mesh Gas-Chrom Q (supplied by Applied Science Labs., P.O. Box 140, State College, Pa.) and chromatographed at about 185° C. The ratio of *cis*- and *trans*-isomers is determined by calculating the area under the respective isomer peaks on the recorded chart. In the case of liquid preparations, three drops of sample are reacted with 0.5 ml. of N,O-bis-(trimethylsilyl) acetamide for about 20 minutes. The reaction solution is then diluted with chloroform to a volume of 5 ml. and the diluted solution is injected into the instrument. Solid samples are analyzed by reacting on gram of the preparation with an excess of N,O-bis(trimethylsilyl)acetamide, extracting the bis-trimethylsilyl ether derivatives with chloroform, diluting to an appropriate volume and injecting the sample into the instrument.

The increased stability of *trans*-diethylstilbestrol premixes prepared by the novel process of this invention is ilustrated in Table I, below. Thirty grams of *trans*-diethylstilbestrol were dissolved in 100 ml. of 95 percent ethanol and the resultant solution was sprayed onto 680 grams of 20 to 60 mesh, feed-grade urea prills in an operating ribbon mixer. The resulting mixture of *trans*-diethylstilbestrol and urea containing 95 percent ethanol was placed on trays in a drying oven and the alcohol was evaporated at 50° C. under vacuum. After one hour, the alcohol was completely removed and the solid preparation containing 4.4 percent *trans*-diethylstilbestrol was sized to granules suitable for incorporation in an animal feed ration and diluted with alfalfa granules to obtain a solid premix containing 2 gms. of *trans*-diethylstilbestrol per pound. The stability data for two separate batches of premix are shown in Table I. An alfalfa premix prepared by the prior art process of dissolving the *trans*-diethylstilbestrol in propylene glycol at 80–100° C. and then spraying the hot solution on the alfalfa granules was also tested. The results are shown for comparison.

TABLE II

Cattle Finishing Ration, Complete—High Energy

| Ingredient: | Lbs./ton |
|---|---|
| Yellow corn | 1224 |
| Corn cobs | 400 |
| Alfalfa meal, dehydrated 17% | 62 |
| Soybean oil meal, solvent extracted, dehulled, 50% | 174 |
| Urea | 11 |
| Cane molasses | 100 |
| Dicalcium phosphate, feed grade | 8 |
| Calcium carbonate | 12 |
| Salt | 6 |
| Trace mineral premix [1] | 0.8 |
| Vitamin A and $D_2$ premix [2] | 1.4 |
| Vitamin E | 1.4 |
| Total | 2000.6 |

[1] Trace mineral premix contains: 2.50% manganese as manganous oxide, 0.07% iodine as potassium iodide, 0.30% cobalt as cobalt carbonate, 0.50% copper as copper oxide, and 20.00% zinc as zinc sulfate.
[2] Each pound contains 2,000,000 U.S.P. units/lb. vitamin A and 227,200 U.S.P. units/lb. vitamin $D_2$.

TABLE I

Percent cis-diethylstilbestrol in alfalfa premixes containing 2 gms. diethylstilbestrol/lb.

| Trans-diethylstilbestrol treatment | Gms. trans-diethyl-stilbestrol/ lb. of premix | Percent cis-isomer in premix | | | | |
|---|---|---|---|---|---|---|
| | | Initial | 1 month at 37° C. | 2 months at 37° C. | 3 months at 37° C. | 6 months at 37° C. |
| 4.4 percent trans-diethylstilbestrol intimately admixed with 95.6 percent urea | 2 | <1 | Nil | Nil | <1 | |
| | 2 | <1 | Nil | Nil | <1 | 1 |
| Trans-diethylstilbestrol [1] in propylene glycol | 2 | 2 | 6 | 10 | 13 | 26 |

[1] Control—Represents a premix illustrative of prior art preparations.

This invention is further illustrated by the following examples.

EXAMPLE 1

One hundred grams of *trans*-diethylstilbestrol are dissolved in 350 ml. of 95 percent ethanol at 25° C. The *trans*-diethylstilbestrol is sprayed onto 45.26 kg. of 20 to 60 mesh, feed-grade urea prills with appropriate mixing in an explosion-proof mixer in an area approved for the handling of flammable solvents. After the spraying of the alcoholic solution is completed, the resultant preparation is transferred to drying trays and placed in a vacuum oven, approved for the removal of flammable vapors, and the ethanol is evaporated at 50° C. After about one hour the alcohol removal is complete. The resulting dry preparation contains *trans*-diethylstilbestrol in the amount of 1 gm./lb. The dry preparation is sized to granules suitable for incorporating in an animal feed ration by passing the agglomerated material through a vibrating sifter equipped with a 20 mesh screen at the top and a 60 mesh screen on the bottom. The fraction of the granules passing the 20 mesh screen and retained on the 60 mesh screen is suitable for use as a feed premix containing 1 gm. of *trans*-diethylstilbestrol per pound.

To prepare a *trans*-diethylstilbestrol-containing complete feed ration with a concentration of 0.5 mg. of *trans*-diethylstilbestrol per pound, one ton of a complete ration as illustrated by the ingredient formula shown in Table II, below, is charged to an appropriate feed mixer, such as a verticle mixer commonly used for the purpose and the mixing operation is started. One pound of the premix containing 1 gm. of *trans*-diethylstilbestrol per pound is added and the mixing is continued for from 5 to 15 minutes. The resulting *trans*-diethylstilbestrol-containing complete feed ration is fed to fattening beef cattle in an amount of about 20 pounds per day per head, thus providing a *trans*-diethylstilbestrol intake of about 10 mg. per day per head.

EXAMPLE 2

One hundred grams of *trans*-diethylstilbestrol having a particle size of 44 microns (−325 mesh) or below are suspended in 350 ml. of a 0.5 percent aqueous dispersion of methylcellulose. The *trans*-diethylstilbestrol dispersion is sprayed onto 4.436 kg. of 20 to 60 mesh, feed-grade urea prills with appropriate mixing. After the spraying is completed, the resultant preparation is transferred to drying trays and placed in a vacuum oven and the water is evaporated at 50° C. After about 8 hours, the water removal is complete and the resulting dry preparation contains *trans*-diethylstilbestrol in an amount of 10 gms./lb. The dry preparation is sized to graules suitable for incorporation into an animal feed ration as in Example 1 to give a feed premix containing 10 gms. of *trans*-diethylstilbestrol per pound.

To prepare a feed premix containing 1 gm. of *trans*-diethylstilbestrol per pound, 9 pounds of alfalfa granules and one pound of the *trans*-diethylstilbestrol-urea mixture described above are charged to an appropriate mixer and the mixer is operated for 5 to 15 minutes.

A complete feed ration containing 0.5 mg. *trans*-diethylstilbestrol is prepared from the alfalfa premix by following the procedure described in Example 1.

EXAMPLE 3

One hundred grams of *trans*-diethylstilbestrol and 2.168 kg. of urea are dissolved in 5 l. of isopropyl ether at 25° C. The isopropyl ether is distilled off under vacuum leaving a dry preparation containing *trans*-diethylstilbestrol in an amount of 20 gms./lb. The resulting dry preparation is pulverized in a low-energy hammer mill, such as a Fitzpatrick mill, operated at about 4,000 r.p.m. with a 1A screen, to granules of a size suitable for incorporation into an animal feed ration. A feed premix containing 1 gm. of *trans*-diethylstilbestrol per pound is prepared by charging 19 pounds of solvent extracted soybean grits and 1 pound of the *trans*-diethylstilbestrol-urea mixture prepared as above to a ribbon mixer and blending for 5 to 15 minutes.

A complete feed ration containing 0.5 mg. *trans*-diethyl stilbestrol is prepared from the soybean premix following the procedure described in Example 1.

EXAMPLE 4

One hundred grams of *trans*-diethylstilbestrol having a particle size of 44 microns or below are dispersed with vigorous stirring in 353.6 gms. of molten urea at a temperature of 150° C. Stirring is continued for about 5 minutes after the addition of the *trans*-diethylstilbestrol has been completed. Heat is removed from the melt and cooling is applied. Stirring is continued until the temperature of the melt reaches about 135° C., and the stirrer is removed from the melt. Solidification of the melt occurs below 133° C. The solid preparation so obtained contains *trans*-diethylstilbestrol in an amount of 100 gms. per pound. The solid preparation is pulverized in a low-energy hammer mill, such as Fitzpatrick mill, operated at about 4,000 r.p.m. with a 1A screen, to granules of a size suitable for incorporation into an animal feed ration. A feed premix containing 1 gm. of *trans*-diethlystilbestrol per pound is prepared by charging 99 pounds of corn meal and 1 pound of the *trans*-diethylstilbestrol-urea mixture prepared as above to a ribbon mixer and blending for 5 to 15 minutes.

A complete feed ration containing 0.5 mg. *trans*-diethylstilbestrol is prepared from the corn meal premix by following the procedure described in Example 1.

EXAMPLE 5

One hundred grams of *trans*-diethylstilbestrol having a particle size between 150 and 850 microns (20–60 mesh) are charged to a fluidized bed chamber, such as a Wurster coating apparatus, and the particle bed is fluidized by blowing warm air through the bed from the bottom. Fifteen grams of urea are dissolved in 25 ml. of water. The urea solution is atomized into the fluidized bed of *trans*-diethylstilbestrol particles through a nozzle placed in the center of the chamber at the bottom of the bed. Warm air at 50° C., or below, is blown through the bed concurrently with the spraying of the urea solution. The application of the urea solution is controlled so as to allow for an essentially concurrent evaporation of the water by the warm air circulating through the bed. Spraying is continued until all of the urea solution has been applied and the circulation of the warm air through the bed is continued for another 20 minutes after the spraying is stopped to effect a complete removal of the water. In the resulting composition 90 percent or more of the particles of *trans*-diethylstilbestrol are enveloped in a substantially continuous adherent coating of urea. The product contains about 87 percent *trans*-diethylstilbestrol. A feed premix containing 1 gm. of *trans*-diethylstilbestrol per pound is prepared by charging 98.85 pounds of wheat bran and 1.15 pounds of the *trans*-diethylstilbestrol-urea mixture prepared as above to a ribbon mixer and blending for 5 to 15 minutes.

A complete feed ration containing 0.5 mg. *trans*-diethylstilbestrol is prepared from the wheat bran premix by following the procedure described in Example 1.

What is claimed is:

1. A composition adapted for incorporation into animal feed rations which comprises an intimate admixture of between about 0.22 percent and about 95 percent by weight of *trans*-diethylstilbestrol and between about 5 percent and about 99.78 percent by weight of urea wherein a multiplicity of particles of *trans*-diethylstilbestrol and urea are in adherent contact with one another.

2. The composition according to claim 1 prepared by intimately admixing from about 1 part to about 19 parts by weight of *trans*-diethylstilbestrol and from about 1 part to about 450 parts by weight of urea in a liquid vehicle selected from the group consisting of $C_1$–$C_3$ monohydric alcohols, acetone, diethyl ether, *n*-propyl ether, isopropyl ether, benzene, *n*-pentane, 2-methylbutane, *n*-hexane, 2-methylpentane, 3-methylpentane, 2,2-dimethylbutane, 2,3-dimethylbutane, *n*-heptane, 2,2-dimethylpentane, 2,2,3-trimethylbutane, water, 0.1 to 5.0 percent aqueous dispersion of methylcellulose, 0.1 to 5.0 percent aqueous dispersion of sodium carboxymethylcellulose, 0.1 to 5.0 percent aqueous dispersion of hydroxypropylcellulose, or 0.1 to 5.0 percent aqueous polyvinylpyrrolidone and evaporating the liquid therefrom.

3. The composition according to claim 1 prepared by intimately dispersing from about 0.22 percent to about 22 percent by weight of very finely divided *trans*-diethylstilbestrol in molten urea at from about 135° to about 170° C., and rapidly cooling the melt to effect solidification maintaining a homogeneous dispersion.

4. The composition according to claim 1 prepared by intimately admixing from about 1 percent to about 95 percent by weight of *trans*-diethylstilbestrol and from about 5 percent to about 99 percent by weight of molten urea at a temperature between about 135° and about 170° C. and solidifying the molten urea maintaining discrete particle identity of the *trans*-diethylstilbestrol.

5. The composition according to claim 1 prepared by intimately admixing from about 1 percent to about 95 percent by weight of *trans*-diethylstilbestrol and from about 5 percent to about 99 percent by weight of urea in a liquid vehicle selected from the group consisting of water, 0.1 to 5.0 percent aqueous dispersions of methylcellulose, 0.1 to 5.0 percent aqueous dispersions of sodium carboxymethylcellulose, 0.1 to 5.0 percent aqueous dispersions of hydroxypropylcellulose, or 0.1 to 5.0 percent aqueous dispersion of polyvinylpyrrolidone in which the urea is soluble and the *trans*-diethylstilbestrol is essentially insoluble, and evaporating the liquid therefrom maintaining discrete particle identity of the *trans*-diethylstilbestrol.

References Cited

OTHER REFERENCES

| | | | |
|---|---|---|---|
| 3,531,563 | 9/1970 | Klothen et al. | 99—4 |
| 3,369,885 | 2/1968 | Takahashi et al. | 71—64 |
| 2,951,760 | 9/1960 | Luther et al. | 424—346 |
| 3,356,504 | 12/1967 | Bender et. al. | 99—2 |
| 2,751,303 | 6/1956 | Burroughs | 424—346 |
| 2,895,875 | 7/1959 | Klette | 424—346 |

OTHER REFERENCES

The Washington Post, "Suit Filed on Cattle Hormone," Oct. 29, 1971, p. A2.

WILBUR L. BASCOMB, JR., Primary Examiner

C. P. RIBANDO, Assistant Examiner

U.S. Cl. X.R.

426—69, 807